Aug. 5, 1947.  A. J. KLOSE  2,425,099
AIRCRAFT WING CONNECTION
Filed Nov. 30, 1944
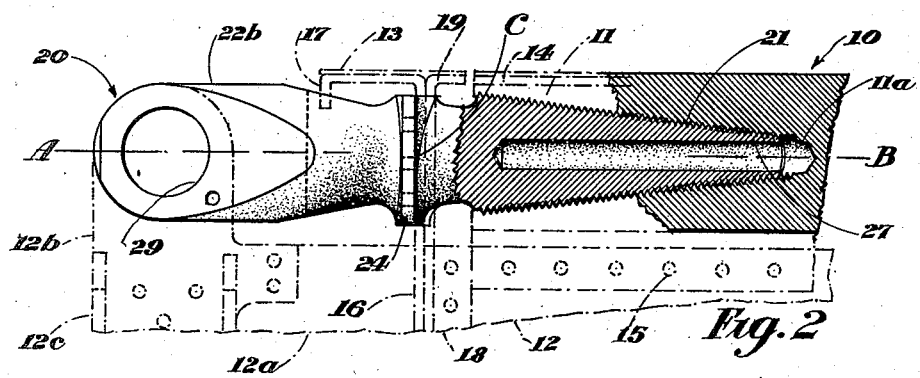
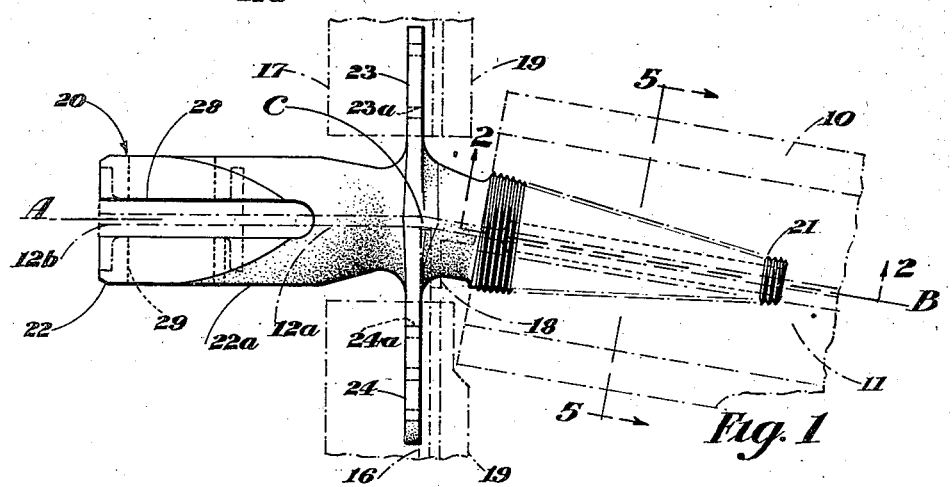
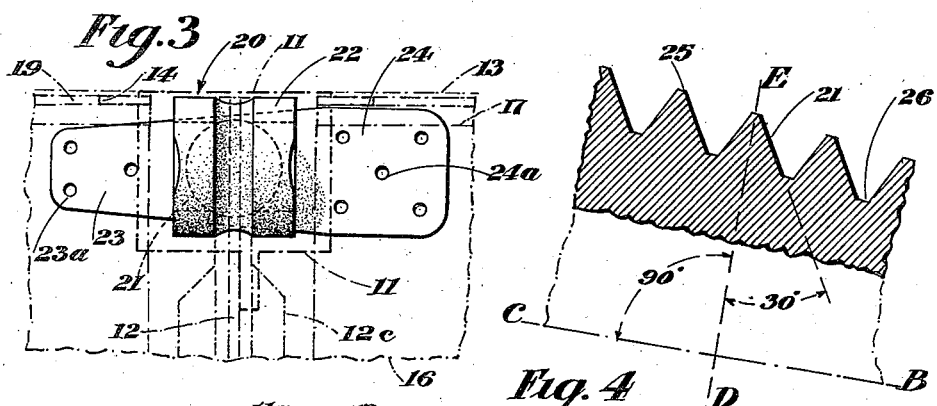
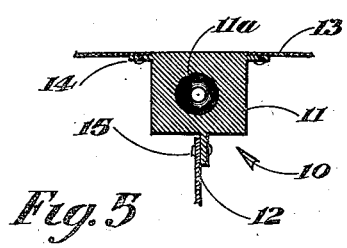
*A. J. Klose* INVENTOR.
BY *James M. Clark*
*His Patent Attorney*

Patented Aug. 5, 1947

2,425,099

UNITED STATES PATENT OFFICE 2,425,099

AIRCRAFT WING CONNECTION

Alfred J. Klose, Rolling Hills, Calif., assignor to Consolidated Vultee Aircraft Corporation, a corporation of Delaware Application November 30, 1944, Serial No. 565,819

7 Claims. (Cl. 244—117)

The present invention relates to improvements in connections and joints and more particularly to improved means for effecting a junction between such major components of an aircraft structure as the outer and inner wing panels.

In the manufacture of aircraft it is customary to construct the wing in a plurality of sections, with a stub wing or center section forming the inner wing panel to which is attached the outer or main wing panels. To facilitate servicing, repair and replacement, the outer wing panels are usually releasably attached to the inner or fuselage sections, these attachments including major structural connections through which the wing loads are transmitted into and across the fuselage during flight. As heretofore constructed they also include a plurality of secondary flange stiffener and cap strip connections primarily for the purpose of joining and aligning the sections and fairing the joints between the skin covering of the two adjacent panels or sections.

The design and construction of the structural joints between the outer and inner wing panels has heretofore presented many problems in order to provide a joint connection which would be as light as possible in weight, and which would not be too complex due to the necessity of including external straps, splices, boltheads and other projections which frequently interfered with adjacent parts and structure. A major cause of structural failures in prior wing-to-fuselage connections has resulted from unequal distribution and high concentration of stresses in transferring the loads between the fuselage and the outer wing panels. These disadvantages and objections have been largely overcome and eliminated by the present invention comprising an improved tapered thread fitting of simple economical construction having a high strength-to-weight ratio, which is easily installed and occupies relatively little space.

It is accordingly a major object of the present invention to provide an improved structural joint or connection particularly adapted for effecting the junction between the major components of an aircraft structure. Another object is the provision of a fitting for such a connection which is relatively simple and economical of construction and highly efficient in its gradual load transferring characteristics. It is a further object to provide such a joint in which the connection is readily made or detached by means of a fitting which is adequate in strength, while light in weight, and occupies relatively little space thereby obviating interference with adjacent parts or structure.

Other advantages and objects will become apparent to those skilled in the art after reading the present description taken together with the accompanying drawings forming a part hereof in which:

Fig. 1 is a top plan view of a fitting embodying the present invention in which the adjacent structure is shown fragmentarily;

Fig. 2 is a partly cross-sectioned side elevational view of the fitting and structure shown in Fig. 1;

Fig. 3 is an end elevational view of the same;

Fig. 4 is an enlarged detail view of the taper threaded portion of the fitting shown in the previous figures; and Fig. 5 is a cross sectional view, to a reduced scale, as taken along the lines 5—5 of Fig. 1.

Referring now to Figs. 1 and 2 the right side of each of these figures represents structure associated with the outer wing panel and the structure of the left half represents that portion inside of the inner bulkhead which is connected to the fuselage or inner wing section. These figures are taken as viewed looking rearwardly, or toward the tail of the airplane, and from the plan view of Fig. 1 it will be noted that the main wing spar or beam 10 is swept forwardly as indicated by the angle made by the spar axis C—B with respect to the normal spanwise axis A—C, longitudinally of the wing span. A forwardly swept spar has been selected for illustrative purposes only and it will be appreciated that the invention is equally applicable to longitudinally aligned or rearwardly swept spars, or to wings in which there is a change in dihedral at the wing-to-fuselage joint. It will also be understood that the spar 10 may be comprised of upper and lower spar cap or chord sections 11 of which only the upper chordal element is shown in the drawings, these chord sections either being the same or varying in accordance with the strength characteristics of the material used and the loads to which they are subjected.

The spar or beam 10 is preferably formed of a flanged extruded section of Duraluminum, or other aluminum alloy or structural material, having laterally and downwardly extending flanges 14 adapted to receive and be riveted to the skin covering sheets 13 and the web plate 12 as by the rivets 15. The inner margin of the outer wing panel is defined by a transverse bulkhead 16 comprising a web plate which is flanged at the top and bottom as at 17 to receive the skin 13 by suitable rivets, or other fastenings. The bulkhead and its flanges are interrupted at the spar fitting connections to permit the extended portions 12a and 12b of the spar web 12 to extend therethrough and are stiffened adjacent the spar web by means of the vertical stiffener angles 18. The upper and lower flanges 17 of the bulkhead plate 16 are additionally reinforced by the similarly interrupted flange angles 19. The extended portion 12b forms upwardly and downwardly extending apertured ear or lug portions and are stiffened by the additional channel structure indicated at 12c.

A fitting 20 of efficient form and function serves to transmit the load from the spar chord 11 through the bulkhead 16 to the fuselage eye fitting portion 22, as well as to serve as a tie or splice between the interrupted portions of the bulkhead 16. This fitting 20 is comprised essentially of a taper threaded conical or male section 21 adapted to be threaded into mating female socket or opening 11a in the spar chord 11, an oppositely extending bifurcated fuselage fitting 22, and intermediate transversely extending flange or ear portions 23 and 24. The tapered conic joint between the threaded portions 11a and 21 comprises an essential portion of the present invention in that it provides a highly efficient means for utilizing to the fullest extent the inherent mechanical advantage of a gradual load transfer. The fitting 20 is preferably formed and machined from chrome molybdenum steel with its conic portion 21 tapered and threaded for its entire length with a single 60 degree sharp V thread. The cross-section of a thread, which has been found satisfactory, is shown in detail in Fig. 4 in which the threads are cut symetrically or 30 degrees on each side about the transverse axis E—D normal to the axis of the conic portion C—B. The sharp V formed at the top and bottom of the threads is preferably flattened or truncated at the conic surfaces which are formed by the ridge and root portions as indicated at 25 and 26.

The allowable tensile stress of the chrome molybdenum steel fitting, as compared to that of the Duraluminum cap element into which it threadingly mates, varies in a ratio of approximately three to one in favor of the steel fitting in the case of the materials which have been selected for this description. The threaded conic portion 21 is provided with an internal bore or cylindrical recess or core 27 in view of the higher allowable stress of this portion; and the diameter of this bore, the end diameters or taper of the threaded portions and the cross-section of the spar chord can be so proportioned that the load is transferred from the spar chord 11 to the conic portion 21, or vice versa, in a predetermined and gradual transfer. In engaging the cone portion 21 with the threaded socket the starting point of the thread is not critical inasmuch as the steel cone plug can be forced into the Duraluminum chord socket several turns after the parts are screwed together hand tight. The number of turns necessary to make up or release the threaded joint depends upon the taper of the cone plug, and the pitch and depth of the thread. The taper shown in the drawings is approximately 3 inches per foot and the plug can be maintained in the attached relationship without the use of a locking device.

The load in being transferred from the wing beam cap member 11 into the fitting 20 is relatively light at the small end of the fitting taper, increasing in proportion as the cross-sectional area of the taper increases, until the fitting is carrying the entire load. This applies equally to the gradual decrease in load within the spar chord, decreasing in proportion as its cross-sectional area is reduced due to the increase in diameter of its tapered socket portion. The desirable loading characteristics described permits a saving in weight by the use of this tapered fitting of from 40 to 50 per cent over the bolted strap or bolted flange connections heretofore utilized for such wing spar connections, and reduces to an extreme minimum the amount of metal it is necessary to remove from the spar cap member in order to accommodate the tapered fitting.

The wing load which is transmitted from the spar chord 11 to the conic tapered portion 21 of the fitting 20 is transferred through its bifurcated or clevis portion 22 to a suitable clevis or other apertured or eye connection (not shown) as by means of a pin engaging the bore 29. The eye portion 22 is slotted as at 28 to receive the abovementioned ear or lug portion 12b which is also apertured to receive the pin engaging the bore 29. The eye portion 22 is of generally circular cross-section adjacent its central portion at C being substantially conic in its form outwardly from the point C to the region of the beginning of the slot 28, at which the sides 22a and top and bottom 22b are faced off to provide a substantially square or rectangular section. The bore 29 of the eye connection at 22 may alternatively serve to receive a hinge pin for use in a folding wing airplane.

In the region of the central point C the two horizontal or laterally extending flange or lug portions 23 and 24 extend such that their outer faces come within the vertical plane formed by the inner surface of the bulkhead web 16, to which it is bolted or riveted through the holes 23a and 24a, respectively. The framing connection assembly is accomplished by first threading the cone plug into the chord socket and after it has been tightened and aligned the spar is assembled and the bulkhead 16—17—18—19 brought into position and fastened to the spar and the ears 23 and 24 of the fitting 20. In assembling the spar its web 12, continuing past the bulkhead 16 as at 12a and 12b, has the latter portion extended between the bifurcations 28 in the eye portion 22 and serves to prevent application of bending loads upon the fitting.

It will accordingly be noted that a compact fitting of relatively high strength-to-weigh ratio is provided to transfer in a gradual and highly efficient manner the loads within the spar chords to the fuselage fitting while at the same time its laterally extending portions serve to stiffen and tie together the portions of the bulkheads which are interrupted by the insertion of the fitting. It will also be noted that the junction between these major components of the aircraft structure is effected without the necessity of external straps, splices, bulkheads or other projections resulting in a relatively clean design which eliminates to a great extent the possibility of interference with nearby parts of the structure. Other forms and modifications of the present invention both with respect to its general arrangement and specific details, as may occur to those skilled in the art after reading the present specification, are intended to come within the scope of this invention as more particularly defined in the appended claims.

I claim:

1. In aircraft construction; a wing having inner and outer wing panels; said outer panel including a spanwise extending spar chord element having a conic threaded portion therein; and a unitary wing spar fitting for joining said panels comprising a correspondingly threaded conic portion engaging the conic threaded portion of said spar chord element and an apertured portion adapted to be connected to said inner wing panel.

2. In aircraft construction, an inner wing panel, an outer wing panel having a spar chord, a conic threaded socket longitudinally disposed at the inner end of said outer wing spar chord and connecting means having a conic threaded portion engageable with said socket portion and an oppositely disposed clevis adapted for the connection of said outer wing panel to said inner wing panel.

3. In a structural joint for aircraft; an aircraft supporting structure; an aircraft component contiguously disposed with respect to said supporting structure; said aircraft component having a longitudinal chordal element and a transverse bulkhead element; said chordal element having a conic threaded socket portion; and a unitary fitting for connecting said aircraft component to said supporting structure including a threaded conic male portion engageable with said threaded conic socket portion of said chordal element and further connecting means carried by said fitting at an opposed portion thereof with respect to said conic male portion on the opposite side of said bulkhead element for attachment to said supporting structure.

4. A structural joint for connecting an aircraft component including a longitudinal spar chord element and a transverse bulkhead element to a supporting structure, comprising a unitary fitting comprising a conic threaded portion axially engageable with a mating conic recess in said spar chord element, said fitting being apertured at an opposed terminal for attachment to a supporting structure, and flange elements projecting from an intermediate portion of said fitting for attachment to said bulkhead.

5. A structural joint for connecting an aircraft component to a supporting structure, said aircraft component including a longitudinal spar member and a transverse bulkhead member, said spar member including upper and lower longitudinal chord elements, said bulkhead member including a transversely extending web plate, and connection means comprising a threaded conic portion longitudinally engaging with a mating threaded socket in one of said spar chord elements, said connection means having integral laterally extending lug portions for attachment to the web plate of said bulkhead member and an apertured portion provided on said connection means for the attachment of said component to a supporting structure.

6. In aircraft wing construction comprising inner and outer wing assemblies, said outer wing assembly including a longitudinally extending spar having a co-extending chord element and a transverse bulkhead, means for detachably connecting said inner and outer wing panels comprising a joint fitting having a conic threaded male portion engageable with a threaded socket portion at the inner terminal of said outer wing spar chord, said joint fitting having an inner bifurcated portion for attachment to said inner wing assembly and flanged portions projecting from an intermediate portion of said joint fitting adapted for attachment to said transverse bulkhead.

7. In aircraft construction; a fuselage section; an outer wing panel disposed outboard of said fuselage section; said outer wing panel including a spar chord of a material having a given allowable stress; a threaded conic socket in said spar chord; a unitary fitting for the attachment of said outer wing panel to said fuselage section; a conic threaded attachment portion on said fitting engageable with said threaded socket in said spar chord; the said attachment portion of said fitting being of a material of appreciably greater allowable stress than said spar chord material, and the taper of said threaded conic attachment portions being proportioned to permit a gradual load transfer between said outer wing panel spar chord and said unitary attachment fitting.

ALFRED J. KLOSE.

REFERENCES CITED

The following references are of record in the file of this patent:

UNITED STATES PATENTS

| Number | Name | Date |
| --- | --- | --- |
| 2,347,542 | Cyron et al. | Apr. 25, 1944 |
| 1,167,943 | Short et al. | Jan. 11, 1916 |
| 1,403,553 | Horn | Jan. 17, 1922 |
| 1,908,838 | Green et al. | May 16, 1933 |